Figure 1:
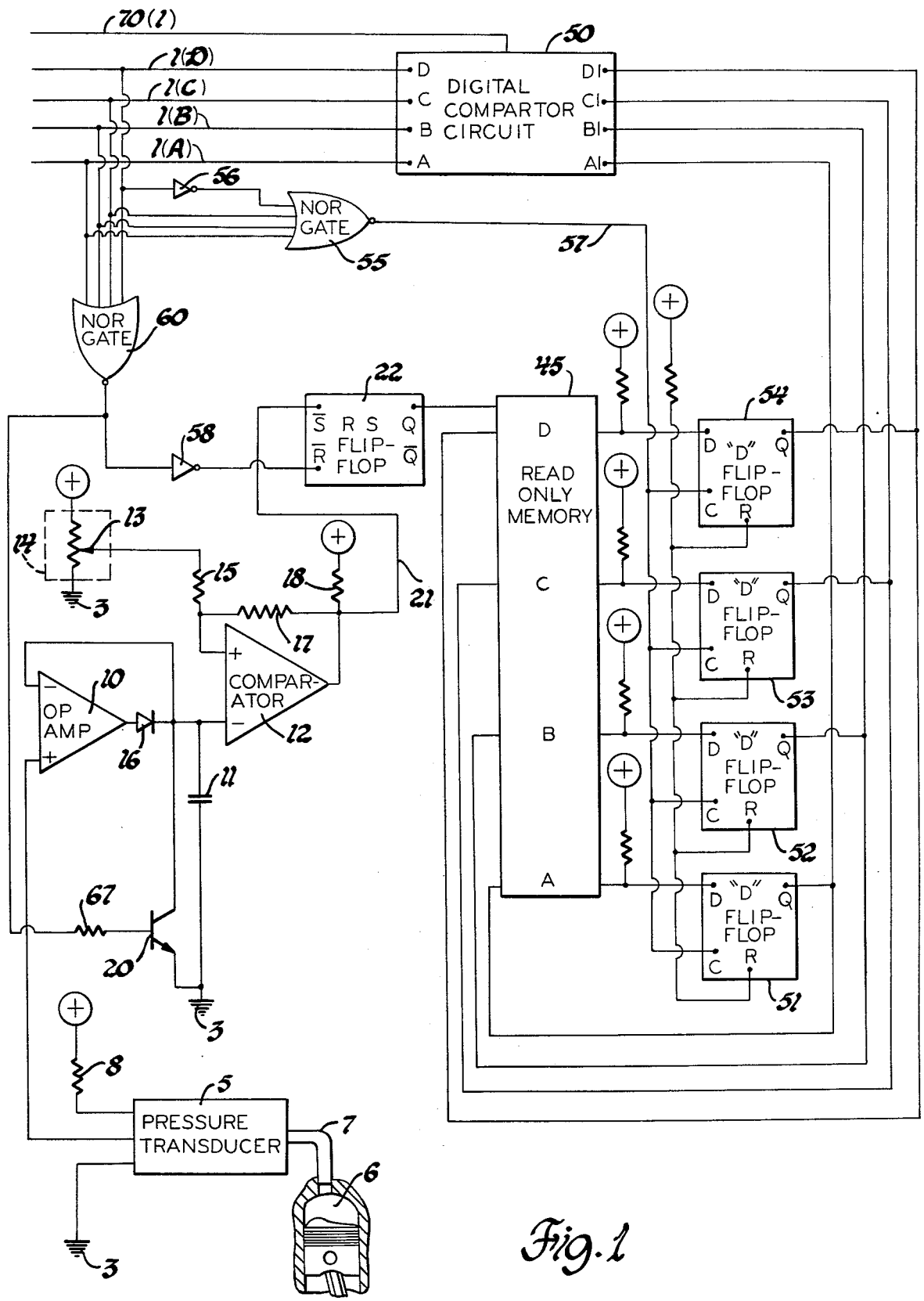

United States Patent [19]

Sand

[11] 4,054,111
[45] Oct. 18, 1977

[54] INTERNAL COMBUSTION ENGINE ELECTRONIC IGNITION SPARK TIMING SYSTEM MODULATED BY CYLINDER COMBUSTION PRESSURE

[75] Inventor: Roger D. Sand, Kokomo, Ind.

[73] Assignee: General Motors Corporation, Detroit, Mich.

[21] Appl. No.: 706,789

[22] Filed: July 19, 1976

[51] Int. Cl.² .................................... F02P 5/04
[52] U.S. Cl. ...................... 123/117 D; 123/117 R; 123/148 E
[58] Field of Search .......... 123/117 D, 117 R, 148 E, 123/119 ED; 73/35

[56] References Cited

U.S. PATENT DOCUMENTS

| | | | |
|---|---|---|---|
| 2,407,652 | 9/1946 | Costa | 123/117 R |
| 2,958,317 | 11/1960 | McNally | 123/119 ED |
| 3,100,479 | 8/1963 | Wood | 123/148 E |
| 3,418,989 | 12/1968 | Silverman | 123/148 E |
| 3,757,755 | 9/1973 | Carner | 123/117 D |
| 3,885,720 | 5/1975 | Brennan | 123/148 E |
| 3,903,856 | 9/1975 | McDougal et al. | 123/117 R |
| 3,957,023 | 5/1976 | Peterson | 123/117 D |
| 4,002,155 | 1/1977 | Harned et al. | 123/148 E |

*Primary Examiner*—Ronald H. Lazarus
*Assistant Examiner*—Andrew M. Dolinar
*Attorney, Agent, or Firm*—Richard G. Stahr

[57] ABSTRACT

An encoder produces for each cylinder of an internal combustion engine a plurality of crankshaft position digital code signal groups, each being a representation of a respective different crankshaft position in degrees relative to piston top dead center. A memory circuit responsive to the last output digital code signal group thereof and an excessive cylinder combustion pressure indicating signal, produced when the combustion pressure of a selected engine cylinder exceeds a predetermined value, is preprogrammed to produce, with the presence of the excessive cylinder combustion pressure indicating signal, the digital code signal group representation of the crankshaft position in retard from that as represented by the last output digital code signal group thereof by a preselected number of crankshaft position degrees retard and to produce, in the absence of the excessive cylinder combustion pressure indicating signal, the digital code signal group representation of the crankshaft position in advance of that as represented by the last output digital code signal group thereof by a preselected number of crankshaft position degrees advance. The digital code signal group to which the memory circuit is responsive and the crankshaft position digital code signal groups are compared in a digital comparator which produces an output ignition spark initiating signal when these two signals are equal. Every two crankshaft revolutions, circuitry responsive to a clock signal applies to the input terminals of the comparator an updated digital code signal group and circuitry responsive to a reset signal erases the excessive combustion pressure indicating signal, if present.

5 Claims, 3 Drawing Figures

INTERNAL COMBUSTION ENGINE ELECTRONIC IGNITION SPARK TIMING SYSTEM MODULATED BY CYLINDER COMBUSTION PRESSURE

This invention relates to an internal combustion engine electronic ignition spark timing system and, more specifically, to an internal combustion engine electronic ignition spark timing system modulated by cylinder combustion pressure.

The ignition spark timing for most internal combustion engines is established by engine speed and load. The engine speed ignition spark advance is produced by centrifugal weights rotated by the distributor shaft and the engine load ignition spark advance is produced by a vacuum actuator unit or vacuum motor in communication with the engine intake manifold vacuum. A particular disadvantage of the conventional centrifugal and vacuum ignition spark advance system is that the ignition spark advance follows a predetermined ignition spark advance curve desgined into the ignition distributor regardless of conditions under which the engine is operating. It has been found that the efficiency and emission output level of an internal combustion engine may be significantly improved by initiating the ignition spark at the crankshaft position which will result in a cylinder combustion pressure of a preselected maximum value. Therefore, an internal combustion engine electronic ignition spark timing system which initiates the ignition spark at the engine crankshaft position which will result in a cylinder combustion pressure of substantially the predetermined value is desirable.

It is, therefore, an object of this invention to provide an improved internal combustion engine electronic ignition spark timing system.

It is another object of this invention to provide an improved internal combustion engine electronic ignition spark timing system modulated by cylinder combustion pressure.

It is an additional object of this invention to provide an improved internal combustion engine electronic ignition spark timing system which automatically advances the ignition spark to the crankshaft position which will result in a cylinder combustion pressure substantially equal to a preselected value and will retard the ignition spark when cylinder combustion pressure exceeds the predetermined value.

In accordance with this invention, an internal combustion engine electronic ignition spark timing system modulated by cylinder combustion pressure is provided wherein, for each engine cylinder, a plurality of crankshaft position digital code signal groups, each being a representation of a respective different engine crankshaft position in degrees relative to piston top dead center, are compared with an output digital code signal group of a function generator device arranged to output, with the presence of an excessive cylinder combustion pressure indicating signal, the digital code signal group representation of crankshaft position degrees in retard from that as represented by the last output digital code signal group thereof by a selected number of crankshaft position degrees and to output, in the absence of an excessive cylinder combustion pressure indicating signal, the digital code signal group representation of crankshaft position degrees in advance of that as represented by the last output digital code signal group thereof by a selected number of crankshaft position degrees and an output ignition spark initiating signal is produced when one of the crankshaft position digital code signal groups is equal to the function generator output digital code signal group to which the function generator is responsive.

Figure 2:
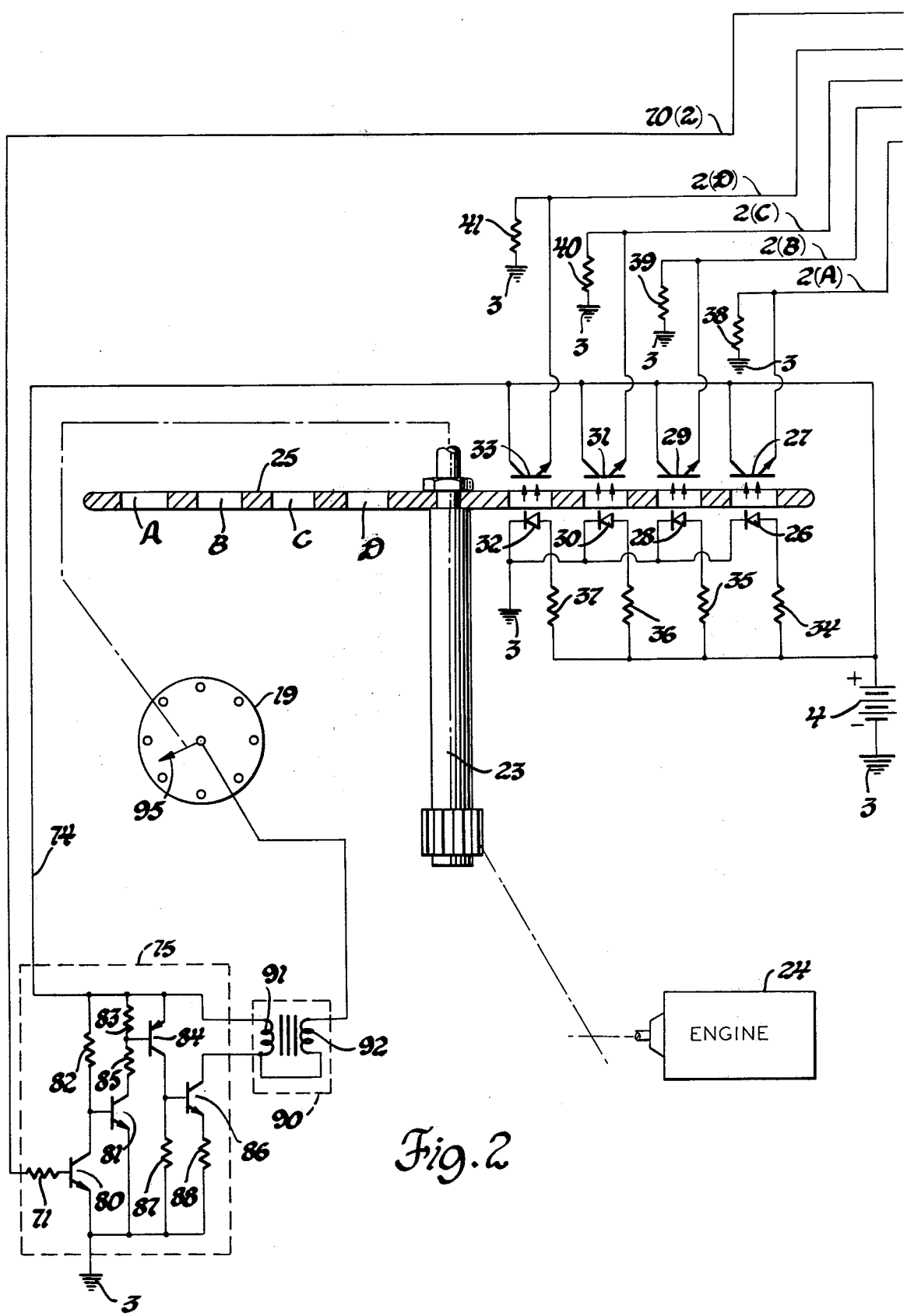
Figure 3:
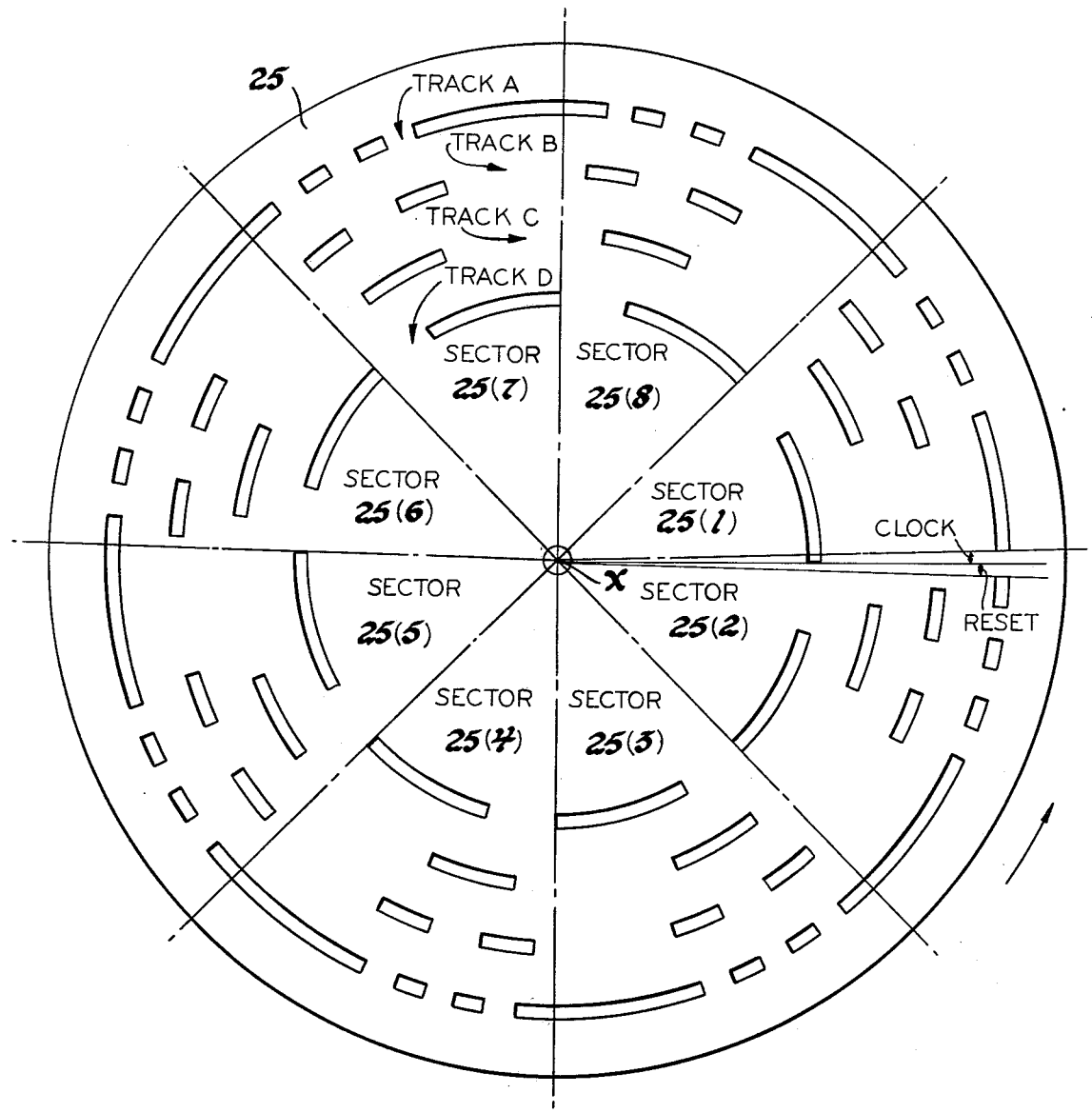

For a better understanding of the present invention, together with additional objects, advantages and features thereof, reference is made to the following description and accompanying drawing in which:

FIG. 1 sets forth the internal combustion engine electronic ignition spark timing system of this invention partially in schematic and partially in block form;

FIG. 2 schematically represents a method for producing engine crankshaft position digital code signal groups suitable for use with the circuitry of FIG. 1 and includes a schematic diagram of an electronic ignition system suitable for use with the circuitry of FIG. 1; and FIG. 3 is a top view of an encoder disk suitable for use with the internal combustion electronic ignition spark timing system of this invention.

As point of reference or ground potential is the same point electrically throughout the system, it has been illustrated by the accepted schematic symbol in FIGS. 1 and 2 and referenced by the numeral 3.

In the interest of reducing the complexity of FIG. 1 of the drawing, a specific operating potential supply has not been shown. It is to be understood that all of the points identified by a plus sign within a circle are connected to the positive polarity output terminal of any well-known source of direct current potential, such as an automobile storage battery, having a direct current output potential magnitude consistent with the operating potential requirements of the circuitry of FIG. 1.

The combustion pressure of a selected cylinder of an associated internal combustion engine is monitored and circuitry is provided for producing an excessive cylinder combustion pressure indicating signal when the combustion pressure of the monitored cylinder exceeds a predetermined value. It has been determined that, with high turbulence combustion chambers, the peak cylinder combustion pressure should be approximately four hundred pounds per square inch (400 psi) for a compromise of maximum efficiency and minimum emission levels and that the peak cylinder combustion pressure may be increased as the turbulence decreases or as the amount of exhaust gas recirculated is increased. The pressure input of a conventional pressure transducer 5 is placed in communication with the combustion chamber 6 of the selected monitored engine cylinder through a pressure line 7. Pressure transducer 5 may be any suitable commercially available linear pressure transducer well-known in the art of the type capable of producing a direct current output potential which increases linearly with input pressure. One example of a linear pressure transducer suitable for use with this application is marketed by the National Semiconductor Corporation of Santa Clara, California and is designated as the LX1400A series of highly accurate, temperature compensated linear pressure transducers. Operating potential is supplied to pressure transducer 5 through current limiting resistor 8. The output direct current potential signal of pressure transducer 5, which increases linearly as the combustion pressure of combustion chamber 6 increases in magnitude, is applied to the non-inverting input terminal of a conventional operational amplifier circuit 10 connected as a voltage follower. The output direct current potential of pressure transducer 5 is amplified by operational amplifier 10, the output potential of which charges capacitor 11. The charge upon capacitor 11 is applied to the inverting input terminal of a well-known inverting comparator with hysteresis circuit 12. A reference voltage of a magnitude equal to the voltage drop across movable contact 13 of a conventional potentiometer 14 and point of reference or ground potential 3 is applied through resistor 15 to the non-inverting input terminal of comparator circuit 12. Movable contact 13 of potentiometer 14 is adjusted to the point at which the reference voltage applied to the non-inverting input terminal of comparator circuit 12 is equal to the charge upon capacitor 11 as produced by a cylinder combustion pressure substantially equal to the preselected, predetermined value. Diode 16 prevents capacitor 11 from discharging back through the output transistor of operational amplifier 10, resistor 17 provides hysteresis for comparator circuit 12 and resistor 18 is pull-up resistor for comparator circuit 12, the output terminal of which is the uncommitted collector of a grounded emitter NPN output transistor. The collector-emitter electrodes of an NPN transistor 20 are connected across capacitor 11 to provide a discharge circuit therefor in a manner to be later explained.

Operational amplifier 10 and comparator circuit 12 may be selected from commercially available integrated circuit modules. One example of a commercially available operational amplifier circuit suitable for use as operational amplifier 10 is one section of an LM 124 quad operational amplifier package marketed by the National Semiconductor Corporation and one example of a commercially available comparator circuit suitable for use as comparator circuit 12 is one section of an LM 339 quad comparator package also marketed by the National Semiconductor Corporation.

The output terminal of comparator circuit 12 is connected through lead 21 to the "S" input terminal of a conventional R-S flip-flop circuit 22. The R-S flip-flop circuit is a well-known logic circuit element which is placed in the "Set" condition in which a logic 1 signal is present upon the "Q" output terminal and a logic 0 signal is present upon the "Q̄" output terminal thereof upon the application of a logic 0 signal to the "S" input terminal and is placed in the "Reset" condition in which a logic 0 signal is present upon the "Q" output terminal and a logic 1 signal is present upon the "Q̄" output terminal thereof upon the application of a logic 0 signal to the "R̄" input terminal.

When the cylinder combustion pressure in combustion chamber 6 is equal to or greater than the predetermined value of cylinder combustion pressure, the charge upon capacitor 11 is equal to or greater than the reference voltage applied to the non-inverting input terminal of inverting comparator circuit 12. Consequently, when the cylinder combustion pressure of combustion chamber 6 is equal to or greater than the predetermined cylinder combustion pressure value, a logic 0 signal appears upon the output terminal of inverting comparator circuit 12. This logic 0 signal is applied to the "S" input terminal of R-S flip-flop circuit 22 to place this device in the "Set" condition in which a logic 1 signal is present upon the "Q" output terminal thereof. This logic 1 excessive cylinder combustion pressure indicating signal is retained upon the "Q" output terminal of R-S flip-flop circuit 22 until a logic 0 reset signal, produced in a manner to be later explained, is applied to the "R̄" input terminal to place R-S flip-flop circuit 22 in the "Reset" condition in which a logic 0 signal is present upon the "Q"output terminal. R-S flip-flop circuit 22, therefore, is a resettable memory circuit having "Set" and "Reset" signal input circuitry.

An encoder is employed for producing for each cylinder of an associated internal combustion engine a plurality of crankshaft position digital code signal groups, each being a representation of a respective different engine crankshaft position in degrees relative to piston top dead center, and for producing successively once every two engine crankshaft revolutions a clock signal digital code signal group and a reset signal digital code signal group. One example, and without intention or inference of a limitation thereto, of a suitable encoder arrangement for use with this invention is set forth in FIGS. 2 and 3.

For purposes of this specification, the timing system of this invention will be described on the basis of an eight cylinder engine application and four-bit engine crankshaft position digital code signal groups.

Disk 25, FIGS. 2 and 3, of a suitable material such as aluminum, steel or any of the many commercially available plastic materials is attached to and rotated by the shaft 23 of the ignition distributor 19 of an associated internal combustion engine 24. Consequently, disk 25 is rotated through 360 mechanical degrees once every two engine crankshaft revolutions. The selection of the material for disk 25 is not critical, it being only necessary that the material selected be of sufficient strength to be self-supporting and not transmit light. Disk 25, as best illustrated in FIG. 3, is divided into sectors, each sector corresponding to a cylinder of the engine with which the timing system of this invention is employed; has a plurality of concentric circular tracks about the center of rotation X thereof, each of the circular tracks corresponding to a bit of the engine crankshaft position digital code signal groups; and has a plurality of arcuate areas, outlined by solid boundary lines, in each concentric circular track through which light may be transmitted. With an eight cylinder engine, four-bit engine crankshaft position digital code signal group application, therefore, disk 25 is divided into eight sectors 25(1), 25(2), 25(3), 25(4), 25(5), 25(6), 25(7) and 25(8), each corresponding to a cylinder of engine 24, and has four concentric circular tracks A, B, C and D, each corresponding to a bit of each engine crankshaft position digital code signal group. Referring to FIG. 2, a light emitting diode and a corresponding phototransistor pair corresponding to each concentric circular track of disk 25 is provided. The light emitting diodes and phototransistors are located on opposite sides of disk 25 and are so positioned relative to each other that the light emitted by each light emitting diode illuminates the corresponding phototransistor while one of the arcuate areas of the corresponding concentric circular track through which light may be transmitted passes therebetween The light emitting diode 26 and phototransistor 27 pair correspond to concentric circular track A of disk 25, the light emitting diode 28 and phototransistor 29 pair correspond to concentric circular track B of disk 25, the light emitting diode 30 and phototransistor 31 pair correspond to concentric circular track C of disk 25 and the light emitting diode 32 and phototransistor 33 pair correspond to concentric circular track D of disk 25. Operating potential for each of light emitting diodes 26, 28, 30 and 32 is supplied by battery 4 through respective current limiting resistors 34, 35, 36 and 37 and operating potential for each of phototransistors 27, 29, 31 and 33 is supplied by battery 4 connnected to the respective collector leads and to the respective emitter leads through ground 3 and respective pull down resistors 38, 39, 40 and 41. As is well-known in the art, a phototransistor becomes conductive through the collector-emitter electrodes thereof while illuminated. Therefore, while any of phototransistors 27, 29, 31 or 33 are illuminated by the corresponding light emitting diode 26, 28, 30 or 32, a logic 1 signal appears across the respective output lead 2(A), 2(B), 2(C) or 2(D) and point of reference or ground potential 3 and while any of phototransistors 27, 29, 31 or 33 are not illuminated, a logic 0 signal appears upon the respective output lead. When the light emitted by light emitting diode 26 illuminates phototransistor 27, this device becomes conductive through the collector-emitter electrodes and a logic 1 signal appears across lead 2(A) and point of reference or ground potential 3; when the light emitted by light emitting diode 28 illuminates phototransistor 29, this device becomes conductive through the collector-emitter electrodes and a logic 1 signal appears across lead 2(B) and point of reference or ground potential 3; when the light emitted by light emitting diode 30 illuminates phototransistor 31, this device becomes conductive through the collector-emitter electrodes and a logic 1 signal appears across lead 2(C) and point of reference or ground potential 3 and when the light emitted by light emitting diode 32 illuminates phototransistor 33, this device becomes conductive through the collector-emitter electrodes and a logic 1 signal appears across lead 2(D) and point of reference or ground potential 3. While any of phototransistors 27, 29, 31 or 33 is not illuminated, a logic 0 signal appears across the corresponding respective lead 2(A), 2(B), 2(C) or 2(D) and point of reference or ground potential 3. The arcuate areas of each of concentric circular tracks A, B, C and D of disk 25 through which light may be transmitted, therefore, are so proportioned and positioned relative to each other that as disk 25 is rotated in a counterclockwise direction by distributor shaft 23, as indicated in FIG. 3, phototransistors 27, 29, 31 and 33 produce a plurality of four-bit engine crankshaft position digital code signal groups for each cylinder of the associated internal combustion engine 24, each of which is a representation of a respective different engine crankshaft position in degrees relative to piston top dead center.

As a clock signal digital code signal group and a reset signal digital code signal group must be produced once every two engine crankshaft revolutions or once every 360 mechanical degrees rotation of disk 25, in the one sector of disk 25 which passes between the light emitting diode-phototransistor pairs immediately following the sector corresponding to the selected monitored engine cylinder, the pattern of arcuate areas through which light may be transmitted is arranged to produce sixteen four-bit digital code signal groups in accordance with the following Table No. 1:

| Digital Code Signal Group No. | Bit A | Bit B | Bit C | Bit D |
| --- | --- | --- | --- | --- |
| 1 | 1 | 0 | 0 | 0 |
| 2 | 1 | 1 | 0 | 0 |
| 3 | 0 | 1 | 0 | 0 |
| 4 | 0 | 1 | 1 | 0 |
| 5 | 1 | 1 | 1 | 0 |
| 6 | 1 | 0 | 1 | 0 |
| 7 | 0 | 0 | 1 | 0 |
| 8 | 0 | 0 | 1 | 1 |
| 9 | 1 | 0 | 1 | 1 |
| 10 | 1 | 1 | 1 | 1 |
| 11 | 0 | 1 | 1 | 1 |
| 12 | 0 | 1 | 0 | 1 |
| 13 | 1 | 1 | 0 | 1 |
| 14 | 1 | 0 | 0 | 1 |
| 15 | 0 | 0 | 0 | 1 |
| 16 | 0 | 0 | 0 | 0 |

For the purpose of describing the preferred embodiment of this invention, digital code signal group No. 15, 0001, and digital code signal group No. 16, 0000, of Table No. 1 above, produced successively in that order once every two engine crankshaft revolutions as disk 25 is rotated counterclockwise through 360 mechanical degrees, are selected as the clock signal digital code signal group and the reset signal digital code signal group, respectively. In each of the remaining seven sectors of disk 25, therefore, the pattern of accurate areas through which light may be transmitted is arranged to produce the fourteen digital code signal groups of Table No. 1 above between digital code signal group No. 1 and digital code signal group No. 14, inclusive. Each of the digital code signal groups other than the reset and clock signal digital code signal groups is representative of a respective different engine crankshaft position in degrees relative to the top dead center position of the piston of the corresponding engine cylinder. With this encoder arrangement, therefore, a clock signal digital code signal group and a reset signal digital code signal group are produced every two engine crankshaft revolutions and 14 engine crankshaft position digital code signal groups are produced for each cylinder of engine 24.

The digital code signal groups set forth in Table No. 1 above represent what is commonly known as a "gray code." This code is preferred for this application in that, in the digital word sequence thereof, only one bit of a word is changed at a time to form the next word or group. This code, therefore, eliminates or greatly reduces the possibility of output digital code errors. It is to be specifically understood, however, that other digital code signal groups of more or less bits per group may be employed with the ignition spark timing system of this invention without departing from the spirit of the invention.

For purposes of this specification, and without intention or inference of a limitation thereto, the engine crankshaft position in degrees advance relative to piston top dead center as represented by each crankshaft position digital code signal group is set forth in the following Table No. 2:

| Digital Code Signal Group No. | Digital Code Signal Group | Engine Crankshaft Position in Degrees Advance Relative to Piston TDC |
| --- | --- | --- |
| 1 | 1000 | 36° |
| 2 | 1100 | 34° |
| 3 | 0100 | 32° |
| 4 | 0110 | 30° |
| 5 | 1110 | 28° |
| 6 | 1010 | 26° |
| 7 | 0010 | 24° |
| 8 | 0011 | 22° |
| 9 | 1011 | 20° |
| 10 | 1111 | 18° |
| 11 | 0111 | 16° |
| 12 | 0101 | 14° |
| 13 | 1101 | 12° |
| 14 | 1001 | 10° |

A review of Table No. 2 above indicates that the engine crankshaft position digital code signal groups represent engine crankshaft position in degrees relative to piston top dead center in increments of 2 engine crankshaft degrees between a minimum of 10 and a maximum of 36 engine crankshaft degrees in advance of piston top dead center. The arcuate areas of the concentric circular tracks A, B, C and D of disk 25 through which light may be transmitted, therefore, are so proportioned and positioned relative to each other in each sector of disk 25 that each next succeeding engine crankshaft position digital code signal group is produced 2 engine crankshaft position degrees from each next preceding one.

Disk 25 is so oriented relative to engine crankshaft position that the clock signal digital code signal group and the reset signal digital code signal group are produced successively in this order immediately after the firing of the monitored engine cylinder so as to update the timing of the following engine cylinders according to the combustion pressure generated in the monitored engine cylinder. In accordance with the engine crankshaft position digital code signal group representations selected for purposes of describing the timing system of this invention as set forth in Table 2 above, and further assuming the No. 1 cylinder of engine 24 to be the selected monitored cylinder, disk 25 is so oriented that the clock and reset digital code signal groups are produced successively after No. 1 engine cylinder has been fired and that the engine crankshaft position digital code signal group No. 1 is produced for each cylinder of engine 24 at 36 engine crankshaft degrees in advance of the piston top dead center positioned.

A read only memory circuit 45, such as a commercially available type SM74188A programmable read only memory unit marketed by the National Semiconductor Corporation, may be employed for producing an output digital code signal group of the same number of bits as the engine crankshaft position digital code signal groups in response to the input signal combination of the last output digital code signal group produced thereby and the signal present upon the output circuit of the resettable memory circuit 22. In the preferred embodiment, read only memory circuit 45 is preprogrammed to produce, with the presence of the logic 1 excessive cylinder combustion pressure indicating signal upon the "Q" output terminal of R-S flip-flop circuit 22, the digital code signal group representation of the engine crankshaft position in retard from that as represented by the last output digital code signal group thereof by a preselected number of engine crankshaft position degrees retard and to produce, in the absence of the logic 1 excessive cylinder combustion pressure signal upon the "Q" output terminal of R-S flip-flop circuit 22, the digital code signal group representation of the engine crankshaft position in advance of that as represented by the last output digital code signal group thereof by a preselected number of engine crankshaft position degrees advance. For example, with a last read only memory circuit 45 output digital code signal group 1010, the digital code signal group representation of 26 engine crankshaft position degrees advance relative to piston top dead center, and a logic 1 excessive cylinder combustion pressure indicating signal present upon the "Q" output terminal of R-S flip-flop circuit 22 and assuming that, with the presence of a logic 1 excessive cylinder combustion pressure indicating signal, the preselected number of engine crankshaft position degrees in retard from the engine crankshaft position degrees relative to piston top dead center represented by the last output digital code signal group of read only memory circuit 45 is 4 degrees, read only memory circuit 45 would produce the output digital code signal group 0011, the digital code signal group representation of 22 engine crankshaft position degrees advance which is in retard of 26 engine crankshaft position degrees by 4 degrees. Similarly, with a last read only memory circuit 45 output digital code signal group 0011, the digital code signal group representation of 22 engine crankshaft degrees advance, and the absence of a logic 1 excessive cylinder combustion pressure indicating signal upon the "Q" output terminal of R-S flip-flop 22 and assuming that, in the absence of a logic 1 excessive cylinder combustion pressure indicating signal, the preselected number of engine crankshaft position degrees in advance of the engine crankshaft position degrees relative to piston top dead center represented by the last output digital code signal group of read only memory circuit 45 Is 2 degrees, read only memory circuit 45 would produce the output digital code signal group 0010, the digital code signal group representation of 24 engine crankshaft position degrees advance which is in advance of 22 engine crankshaft position degrees by 2 degrees. It is to be specifically understood that the specific values hereinabove assigned are for illustrative purposes only and are not to be considered limiting.

To transfer the last read only memory circuit 45 output digital code signal group to the corresponding input terminals of read only memory circuit 45 in response to a clock signal, digital code signal transfer circuitry having an input and a corresponding output circuit corresponding to each bit of the digital code signal groups produced by read only memory circuit 45 is employed. This transfer circuitry may be of the type which transfers the signals present upon the input circuits thereof to respective corresponding output circuits thereof in response to the application of a clock signal thereto. One example of digital code signal transfer circuitry suitable for use with this invention is a type "D" flip-flop circuit corresponding to each bit of the digital code signal groups. Type "D" flip-flop circuits have at least an input circuit terminal, an output circuit terminal and a clock signal input circuit terminal. Each output circuit of read only memory circuit 45 is connected to the input circuit terminal of the corresponding type "D" flip-flop circuit and the output circuit terminal of each of the type "D" flip-flop circuits is connected to the input circuit of read only memory circuit 45 to which it corresponds. In FIG. 1, type "D" flip-flop circuit 51 corresponds to the A bit, type "D" flip-flop circuit 52 corresponds to the B bit, type "D" flip-flop circuit 53 corresponds to the C bit and type "D" flip-flop circuit 54 corresponds to the D bit of the read only memory circuit 45 output digital code signal group. The type "D" flip-flop circuit is a well-known logic circuit element which in the "Set" condition produces a logic 1 signal upon the "Q" output terminal and a logic 0 signal upon the "$\overline{Q}$" output terminal; in the "Reset" condition produces a logic 0 signal upon the "Q" output terminal and a logic 1 signal upon the "$\overline{Q}$" output terminal and transfers the logic signal present upon the "D" input terminal to the "Q" output terminal upon the application of a logic 1 clock signal to the "C" clock input terminal. As each output circuit of read only memory circuit 45 is connected to the "D" input circuit terminal of the corresponding type "D" flip-flop circuit and since the "Q" output circuit terminal of each type "D" flip-flop circuit is connected to the input circuit of read only memory circuit 45 to which it corresponds, upon the simultaneous application of a clock signal to the "C" clock input circuit terminal of all of the type "D" flip-flop circuits, the last output digital code signal group of read only memory circuit 45, transferred to and retained upon the "Q" output circuit terminals of type "D" flip-flop circuits 51, 52, 53 and 54, is applied to the input circuits of read only memory circuit 45 and the resulting output digital code signal group of read only memory circuit 45 is applied to the "D" input circuit terminals of the type "D" flip-flop circuits.

As disk 25 of the encoder arrangement of FIG. 2 is rotated by the ignition distributor shaft 23, the engine crankshaft position digital code signal groups and the read only memory circuit 45 output digital code signal group retained upon the "Q" output circuit terminals of type "D" flip-flop circuits 51, 52, 53 and 54 are compared in a commercially available digital comparator circuit 50 such as a type SN7485 marketed by the National Semiconductor Corporation. The four bits of the engine crankshaft position digital code signal groups generated by the encoder arrangement of FIG. 2 are applied to one set of input terminals A, B, C and D of digital comparator circuit 50 through respective leads 2(A) of FIG. 2 and 1(A) of FIG. 1, 2(B) of FIG. 2 and 1(B) of FIG. 1, 2(C) of FIG. 2 and 1(C) of FIG. 1 and 2(D) of FIG. 2 and 1(D) of FIG. 1. The four bits of the read only memory circuit 45 output digital code signal group retained upon the "Q" output circuit terminals of type "D" flip-flop circuits 51, 52, 53 and 54 are applied to the other set of input terminals A1, B1, C1 and D1 of digital comparator circuit 50. The type SN7485 digital comparator circuit produces a logic 1 output signal upon the output terminal thereof when the digital code signal group present upon one set of input terminals thereof is the same as or is equal to the digital code signal group present upon the other set of input terminals thereof. Consequently, digital comparator circuit 50 is responsive to the engine crankshaft position digital code signal groups and the read only memory circuit 45 output digital code signal group retained upon the respective "Q" output circuit terminals of type "D" flip-flop circuits 51, 52, 53 and 54, for producing a logic 1 output ignition spark initiating signal when one of the engine crankshaft position digital code signal groups is the same as the read only memory circuit 45 output digital code signal group retained upon the "Q" output terminals of type "D" flip-flop circuits 51, 52, 53 and 54.

Referring to Table 1, the digital code signal group 0001 produced once every two crankshaft revolutions by the encoder arrangement set forth in FIG. 2 is employed as a clock signal digital code signal group. The A, B and C bits are impressed upon the input terminals of a conventional commercially available four input NOR gate 55 and the D bit is inverted by a conventional commercially available inverter circuit 56 and applied to the remaining fourth input terminal of NOR gate 55. As a NOR gate circuit produces a logic 1 output signal with the presence of a logic 0 signal upon each of the input terminals thereof, the clock signal digital code signal group 0001 is converted to an output logic 1 clock signal by NOR gate 55. This logic 1 clock signal appears upon the output terminal of NOR gate 55 which is connected to the "C" input circuit terminal of each of type "D" flip-flop circuits 51, 52, 53 and 54 through lead 57.

Again referring to Table 1, the digital code signal group 0000 produced once every two engine crankshaft revolutions by the encoder arrangement set forth in FIG. 2 is employed as a reset signal digital code signal group. The four bits of the reset signal digital code signal group are impressed upon the input terminals of a conventional commercially available four input NOR gate 60. As a NOR gate produces a logic 1 output signal with the presence of a logic 0 signal upon each of the input terminals thereof, the reset signal digital code signal group 0000 is converted to an output logic 1 reset signal by NOR gate 60. This logic 1 reset signal appears upon the output terminal of NOR gate 60 which is connected through a conventional commercially available inverter circuit 58 to the "$\overline{R}$" reset input circuit terminal of R-S flip-flop circuit 22 and to the base electrode of transistor 20 through current limiting resistor 67.

To prepare the ignition spark timing system of this invention for operating a selected engine, movable contact 13 of potentiometer 14, FIG. 1, is adjusted until the potential across movable contact 13 and point of reference or ground potential 3 is equal to the potential of the charge which will be placed upon capacitor 11 when the cylinder combustion pressure in combustion chamber 6 of monitored engine cylinder No. 1 is equal to the predetermined value, for example, 400 pounds per square inch.

For the purpose of describing the operation of the timing system of this invention, it will be assumed that read only memory circuit 45 is preprogrammed to produce, with the presence of the logic 1 excessive cylinder combustion pressure indicating signal, the digital code signal group representation of the crankshaft position in retard from that as represented by the last output digital code signal group thereof by four engine crankshaft degrees and to produce, in the absence of the logic 1 excessive cylinder combustion pressure indicating signal, the digital code signal group representation of the crankshaft position in advance of that as represented by the last output digital code signal group thereof by two engine crankshaft position degrees; that the read only memory circuit 45 output digital code signal group retained upon the "Q" output circuit terminals of type "D" flip-flop circuits 51, 52, 53 and 54 is 1010, the digital code signal group representation of 26 engine crankshaft degrees advance; that the read only memory circuit 45 output digital code signal group applied to the "D" input terminals of type "D" flip-flop circuits 51, 52, 53 and 54 is 1110, the digital code signal group representation of 28 engine crankshaft degrees advance; that sector 25(1) of disk 25 of the encoder arrangement of FIG. 2 corresponds to the monitored cylinder No. 1 of engine 24; that disk 25 is being rotated by distributor shaft 23 in a counterclockwise direction, as indicated in FIG. 3, and that the leading edge of sector 25(1) is in register with the light emitting diode-phototransistor pairs of the encoder arrangement.

As disk 25 is rotated in a counterclockwise direction by distributor shaft 23, the crankshaft postion digital code signal groups of sector 25(1) are produced in succession, beginning with digital code signal group No. 1, and applied to input terminals A, B, C and D of digital comparator circuit 50 through respective leads 2(A), 2(B), 2(C) and 2(D) of FIG. 2 and respective leads 1(A), 1(B), 1(C) and 1(D) of FIG. 1. When the crankshaft position digital code signal group 1010 of sector 25(1) is produced by the encoder arrangement, digital comparator circuit 50 detects the equality between this digital code signal group and the read only memory circuit 45 output digital code signal group 1010 retained upon the "Q" output circuit terminals of type "D" flip-flop circuits 51, 52, 53 and 54 and applied to the A1, B1, C1 and D1 input terminals of comparator circuit 50, and produces an output logic 1 ignition spark initiating signal. This logic 1 ignition spark initiating signal is applied through leads 70(1) of FIG. 1 and 70(2) of FIG. 2 and resistor 71 to the base electrode of NPN input transistor 80 of an electronic ignition system 75. In the absence of an ignition spark initiating signal, NPN transistor 80 is not conductive. While NPN transistor 80 is not conductive, battery 4 supplies base-emitter drive current to NPN transistor 81 through lead 74 and current limiting resistor 82, consequently, NPN transistor 81 is normally conductive through the collector-emitter electrodes. While NPN transistor 81 is conductive, the current flow through resistor 83 provides a voltage drop thereacross which places the base electrode of PNP transistor 84 at a potential sufficiently more negative than that of the emitter electrode thereof to result in a breakdown of the emitter-base junction. While NPN transistor 81 is conductive, therefore, battery 4 supplies emitter-base drive current to PNP transistor 84 through lead 74, the emitter-base electrodes of PNP transistor 84, resistor 85 and the collector-emitter electrodes of NPN transistor 81. While emitter-base drive current is supplied to PNP transistor 84, this device is conductive through the emitter-collector electrodes thereof to complete a circuit through which battery 4 may supply base-emitter drive current to NPN transistor 86, the potential drop across resistor 87 being of a sufficient magnitude to break down the base-emitter junction of NPN transistor 86. While NPN transistor 86 is conductive, an energizing circuit for primary winding 91 of ignition coil 90 is completed which may be traced from the positive polarity terminal of battery 4, through lead 74, primary winding 91, the collector-emitter electrodes of NPN transistor 86, current limiting resistor 88 and point of reference or ground potential 3 to the negative polarity terminal of battery 4. The logic 1 ignition spark initiating signal produced by comparator circuit 50 supplies base-emitter drive current to NPN transistor 80 to trigger this device conductive through the collector-emitter electrodes thereof. Upon the conduction of NPN transistor 80, base drive current is drained from NPN transistor 81 to extinguish this device. When transistor 81 extinguishes, the circuit through which emitter-base drive current is supplied to PNP transistor 84 is interrupted, consequently, PNP transistor 84 extinguishes. When PNP transistor 84 extinguishes, the circuit through which base-emitter drive current is supplied to NPN transistor 86 is interrupted, consequently, transistor 86 is abruptly extinguished to interrupt the energizing circuit previously described for primary winding 91 of ignition coil 90. Upon the interruption of the primary winding 91 energizing circuit, an ignition spark creating potential is induced in secondary winding 92 and is directed to the spark plug of monitored cylinder No. 1 through the movable contact 95 of a conventional ignition distributor 19 in a manner well-known in the art. Consequently, an ignition spark is initiated in the monitored cylinder No. 1 at 26 engine crankshaft degrees advance. When disk 25 of the encoder arrangement of FIG. 2 is rotated further by distributor shaft 23 to the position at which the next engine crankshaft position digital code signal group 0010 is produced, digital comparator circuit 50 no longer detects an equality between the engine crankshaft position digital code signal groups and the read only memory circuit 45 output digital code signal group retained upon the "Q" output circuit terminals of type "D" flip-flop circuits 51, 52, 53 and 54, consequently, the ignition spark initiating signal is no longer present upon the output terminal thereof. In the absence of this ignition spark initiating signal, the electronic ignition system 75 of FIG. 2 operates in a manner previously described to complete the energizing circuit for a primary winding 91 of ignition coil 90 preparatory to firing the next engine cylinder.

Upon the firing of the monitored cylinder No. 1 of engine 24 at 26 engine crankshaft degrees advance in response to the production of the engine crankshaft position digital code signal group 1010 of sector 25(1) of disk 25, the cylinder combustion pressure within combustion chamber 6, FIG. 1, increases. The resulting linearly increasing output direct current potential of pressure transducer 5 is amplified by operational amplifier circuit 10, the output potential of which charges capacitor 11. Should the cylinder combustion pressure of combustion chamber 6 rise to a value greater than the predetermined value, the charge potential upon capacitor 11 applied to the inverting input terminal of inverting comparator circuit 12 would be greater than the reference potential applied to the non-inverting input terminal of inverting comparator circuit 12. With these conditions, a logic 0 output signal is produced by inverting comparator circuit 12 which is applied to the "S" input terminal of R-S flip-flop circuit 22 to place this device in the "Set" condition in which the logic 1 excessive combustion pressure indicating signal is present upon the "Q" output terminal thereof.

Assuming that the resulting monitored cylinder No. 1 combustion pressure exceeds the predetermined value, the logic 1 excessive cylinder combustion pressure indicating signal appears upon the "Q" output terminal of R-S flip-flop circuit 22 and is applied to the corresponding input terminal of read only memory circuit 45. In response to the digital code signal group 1010, the digital code signal group representation of 26 engine crankshaft degrees advance, present upon the "Q" output terminals of type "D" flip-flop circuits 51, 52, 53 and 54 with the presence of the logic 1 excessive cylinder combustion pressure indicating signal, read only memory circuit 45 produces the output digital code signal group 0011, the digital code signal group representation of 22 engine crankshaft degrees advance which is 4 engine crankshaft degrees in retard from 26 engine crankshaft degrees advance. When disk 25 is rotated further to the position at which the clock signal digital code signal group of sector 25(2) of disk 25 is produced by the encoder arrangement of FIG. 2, this signal group is converted by NOR gate 55 to the logic 1 clock signal, as previously explained. Upon the occurrence of the logic 1 clock signal which is simultaneously applied to the clock "C" input terminal of each of type "D" flip-flop circuits 51, 52, 53 and 54, the read only memory circuit 45 output digital code signal group 0011, the digital code signal group representation of 22 engine crankshaft degrees advance, is transferred from the "D" input terminals to the "Q" output terminals of type "D" flip-flop circuits 51, 52, 53 and 54 and is simultaneously applied to the input terminals of read only memory circuit 45 and to one set of input terminals A1, B1, C1 and D1 of digital comparator circuit 50. As the logic 1 excessive cylinder combustion pressure indicating signal is still present, read only memory circuit 45 produces, in response to the last output digital code signal group 0011 thereof now present upon the "Q" output terminals of type "D" flip-flop circuits 51, 52, 53 and 54, the output digital code signal group 1111, the digital code signal group representation of 18 engine crankshaft degrees advance which is 4 engine crankshaft degrees in retard from 22 engine crankshaft degrees advance. When disk 25 is rotated further to the position at which the reset signal digital code signal group of sector 25(2) of disk 25 is produced, the signal group is converted to the logic 1 reset signal by NOR gate 60, as previously explained. This logic 1 reset signal is applied through resistor 67 to the base electrode of NPN transistor 20 and is inverted by conventional commercially available inverter circuit 58 to a logic 0 signal which is applied to the "R" input terminal of R-S flip-flop circuit 22 to place this device in the "Reset" condition in which a logic 0 signal is present upon the "Q" output terminal thereof. Base-emitter drive current is supplied by the logic 1 reset signal to NPN transistor 20 to trigger this device conductive through the collector-emitter electrodes thereof. Capacitor 11 discharges through the collector-emitter electrodes of conducting NPN transistor 20, thus capacitor 11 is placed in a discharged condition preparatory to being recharged by the output potential of operational amplifier circuit 10 upon the increase of cylinder combustion pressure in combustion chamber 6 of the monitored cylinder No. 1 of engine 24 when this cylinder is next fired. As the logic 1 excessive cylinder combustion pressure indicating signal is erased by the logic 1 reset signal, read only memory circuit 45 produces, in response to the output digital code signal group 0011 thereof still present upon the "Q" output terminals of type "D"flip-flop circuits 51, 52, 53 and 54, the output digital code signal group 0010, the digital code signal group representation of 24 engine crankshaft degrees advance which is 2 engine crankshaft position degrees in advance of 22 engine crankshaft degrees advance.

As disk 25 is further rotated in a counterclockwise direction by distributor shaft 23, the crankshaft position digital code signal groups of sector 25(2) are produced in succession, beginning with digital code signal group No. 1, and applied to input terminals A, B, C and D of comparator circuit 50 through circuitry previously described. When the crankshaft position digital code signal group 0011 of sector 25(2) is produced by the encoder arrangement, digital comparator circuit 50 detects the equality between this digital code signal group and the read only memory circuit 45 output digital code signal group 0011 retained upon the "Q" output terminals of type "D" flip-flop circuits 51, 52, 53 and 54 and applied to the A1, B1, C1 and D1 input terminals of comparator circuit 50, and produces an output logic 1 ignition spark initiating signal. This logic 1 ignition spark initiating signal is applied through circuitry previously described to the base electrode of NPN input transistor 80 of an electronic ignition system 75. In response to this ignition spark initiating signal, electronic ignition system 75 produces an ignition spark creating potential in a manner previously explained which is directed to the spark plug of the engine cylinder next to be fired through movable contact 95 of ignition distributor 19. Consequently, the next cylinder to be fired is fired at 22 engine crankshaft degrees advance. As disk 25 is rotated by distributor shaft 23 through 360 mechanical degrees, the read only memory circuit 45 output digital code signal group 0011 is retained upon the "Q" output terminals of type "D"flip-flop circuits and consequently, is maintained upon the A1, B1, C1 and and D1 input terminals of digital comparator circuit 50. Therefore, when the engine crankshaft position digital code signal group 0011 is produced by the encoder arrangement in each of the remaining seven sectors of disk 25, the corresponding cylinder of engine 24 is fired at 22 engine crankshaft degrees advance.

Upon the next firing of the monitored cylinder No. 1 of engine 24 at 22 engine crankshaft degrees advance in response to the engine crankshaft position digital code signal group 0011 of sector 25(1) of disk 25, the cylinder combustion pressure within combustion chamber 6, FIG. 1, increases. Assuming that the peak cylinder combustion pressure in combustion chamber 6 does not exceed the predetermined cylinder combustion pressure value during this combustion period, R-S flip-flop circuit 22 is not placed in the "Set" condition, consequently, the logic 1 excessive cylinder combustion pressure indicating signal is not present upon the "Q" output terminal thereof. Therefore, the read only memory circuit 45 output digital code signal group 0010, the digital code signal group representation of 24 engine crankshaft degrees advance, applied to the "D" input terminals of type "D" flip-flop circuits 51, 52, 53 and 54 remians unchanged.

Upon the occurrence of the next logic 1 clock signal, the read only memory circuit 45 output digital code signal group 0010, the digital code signal group representation of 24 engine crankshaft degrees advance, is transferred from the "D" input terminals to the "Q" output terminals of type "D" flip-flop circuits 51, 52, 53 and 54 and is simultaneously applied to the input terminals of read only memory circuit 45 and to one set of input terminals A1, B1, C1 and D1 of digital comparator circuit 50 through circuitry previously described. In the absence of the logic 1 excessive cylinder combustion pressure indicating signal, read only memory circuit 45 produces, in response to the last output digital code signal group 0010 thereof now present upon the "Q" output terminals of type "D" flip-flop circuits 51, 52, 53 and 54, the output digital code signal group 1010, the digital code signal group representation of 26 engine crankshaft degrees advance which is 2 engine crankshaft degrees in advance of 24 engine crankshaft degrees advance. Upon the occurrence of the next logic 1 reset signal, R-S flip-flop circuit 22 remains in the "Reset" condition in which a logic 0 signal is present upon the "Q" output terminal thereof and capacitor 11 is discharged in a manner previously explained. Therefore, the read only memory circuit 45 output digital code signal group 1010 applied to the "D" input terminals of type "D" flip-flop circuits 51, 52, 53 and 54 remians unchanged.

As disk 25 is rotated by distributor shaft 23 through 360 mechanical degrees, the read only memory circuit 45 output digital code signal group 0010 is retained upon the "Q" output terminals of type "D" flip-flop circuits and consequently, is maintained upon the A1, B1, C1 and D1 input terminals of digital comparator circuit 50. Therefore, when the engine crankshaft position digital code signal group 0010 is produced by the encoder arrangement in each of the eight sectors of disk 25, the corresponding cylinder of engine 24 is fired at 24 engine crankshaft degrees advance.

Upon the next firing of the monitored cylinder No. 1 of engine 24 at 24 engine crankshaft degrees advance in response to the engine crankshaft position digital code signal group 0010 of sector 25(1) of disk 25, the cylinder combustion pressure within combustion chamber 6, FIG. 1, increases. Assuming that the cylinder combustion pressure in combustion chamber 6 does not increase to the predetermined cylinder combustion pressure value during this combustion period, R-S flip-flop circuit 22 is not placed in the "Set" condition in which the logic 1 excessive combustion pressure indicating signal is present upon the "Q" output terminal thereof. Therefore, the read only memory circuit 45 output digital code signal group 1010 applied to the "D" input terminals of type "D" flip-flop circuits 51, 52, 53 and 54 remains unchanged.

Upon the occurrence of the next logic 1 clock signal, the read only memory circuit 45 output digital code signal group 1010, the digital code signal group representation of 26 engine crankshaft degrees advance, is transferred from the "D" to the "Q" output terminals of type "D" flip-flop circuits 51, 52, 53 and 54 and is simultaneously applied to the input terminals of read only memory circuit 45 and to one set of input terminals A1, B1, C1 and D1 of digital comparator circuit 50. In the absence of the logic 1 excessive cylinder combustion pressure indicating signal, read only memory circuit 45 produces, in response to the last output digital code signal group 1010 thereof now present upon the "Q" output terminals of the type "D" flip-flop circuits, the output digital code signal group 1110, the digital code signal group representation of 28 engine crankshaft degrees in advance of 26 engine crankshaft degrees advance. Upon the occurrence of the logic 1 reset signal, R-S flip-flop circuit 22 remains in the "Reset" condition in which a logic 0 signal is present upon the "Q" output terminal thereof and capacitor 11 is discharged in a manner previously explained. Therefore, the read only memory circuit 45 output digital code signal group 1110 applied to the "D" input terminals of type "D" flip-flop circuits 51, 52, 53 and 54 remians unchanged. As disk 25 is rotated by distributor shaft 23 through 360 mechanical degrees, the read only memory circuit 45 output digital code signal group 1010 is retained upon the "Q" output terminals of type "D" flip-flop circuits and, consequently, is maintained upon the A1, B1, C1 and D1 input terminals of digital comparator circuit 50. Therefore, when the engine crankshaft position digital code signal group 1010 is produced by the encoder arrangement in each of the eight sectors of disk 25, the corresponding cylinder of engine 24 is fired at 26 engine crankshaft degrees advance.

While engine 24 continues in the "Run " mode, the sequence of events hereinabove described periodically update the cylinder firing angle every two engine crankshaft revolutions by retarding the firing angle a predetermined number of engine crankshaft degrees when the cylinder combustion pressure of the monitored engine cylinder exceeds the predetermined value and advancing the firing angle a predetermined number of engine crankshaft degrees when the cylinder combustion pressure of the monitored engine cylinder is less than the predetermined value.

It will be obvious to those skilled in the art that digital code signal groups of more than four information bits may be employed with the ignition timing system of this invention to provide more than 14 engine crankshaft position representations for each engine cylinder.

While a preferred embodiment of this invention has been shown and described, it will be obvious to those skilled in the art that various modifications and substitutions may be made without departing from the spirit of the invention which is to be limited only within the scope of the appended claims.

What is claimed is:

1. An electronic ignition spark timing system modulated by cylinder combustion pressure for initiating the production of an ignition spark for each cylinder of an associated internal combustion engine comprising:

means for producing, in response to the combustion pressure of a selected monitored cylinder of said engine, an excessive cylinder combustion pressure indicating signal when the combustion pressure of said monitored cylinder is greater than a predetermined value;

encoder means for producing for each cylinder of said engine a plurality of crankshaft position digital code signal groups, each of said digital code signal groups being a representation of a respective different engine crankshaft position in degrees relative to piston top dead center, and for producing once every two engine crankshaft revolutions a reset signal digital code signal group;

a function generator means responsive to said excessive cylinder combustion pressure indicating signal for periodically producing the digital code signal group representation of the engine crankshaft position in retard from that as represented by the last output digital code signal group thereof by a preselected number of engine crankshaft position degrees retard and for producing, in the absence of said excessive cylinder combustion pressure indicating signal, the digital code signal group representation of the engine crankshaft position in advance of that as represented by the last output digital code signal group thereof by a preselected number of crankshaft position degrees advance;

means responsive to said crankshaft position digital code signal groups and said last output digital code signal group of said function generator for producing an output ignition spark initiating signal when one of said crankshaft position digital code signal groups is the same as said last output digital code signal group of said function generator;

means for converting said reset signal digital code signal group to a reset signal; and means for applying said reset signal to said means for producing said excessive cylinder combustion pressure indicating signal for erasing said excessive combustion pressure signal, if present.

2. An electronic ignition spark timing system modulated by cylinder combustion pressure for initiating the production of an ignition spark for each cylinder of an associated internal combustion engine comprising:

means for producing, in response to the combustion pressure of a selected monitored cylinder of said engine, an excessive cylinder combustion pressure indicating signal when the combustion pressure of said monitored cylinder is greater than a predetermined value;

encoder means for producing for each cylinder of said engine a plurality of crankshaft position digital code signal groups, each of said digital code signal groups being a representation of a respective different engine crankshaft position in degrees relative to piston top dead center, and for producing successively once every two engine crankshaft revolutions a clock signal digital code signal group and a reset signal digital code signal group;

a function generator including input and output circuit means for producing upon said output circuit means once every two engine crankshaft revolutions the digital code signal group representation of the engine crankshaft position in retard from that as represented by the last output digital code signal group thereof by a preselected number of engine crankshaft position degrees retard in response to the presence of said excessive cylinder combustion pressure indicating signal at the input circuit and for producing upon said output circuit means once every two engine crankshaft revolutions the digital code signal group representation of the engine crankshaft position in advance of that as represented by the last output digital code signal group thereof by a preselected number of crankshaft position degrees advance in the absence of said excessive cylinder combustion pressure indicating signal at the input circuit;

digital code signal transfer circuit means having an input and a corresponding output circuit means corresponding to each bit of said digital code signal groups produced by said function generator and being of the type which transfers the signals present upon said input circuit means thereof to the respective corresponding said output circuit means thereof as output digital code signal groups in response to the application of a clock signal thereto;

means for applying said digital code signal groups produced upon said output circuit means of said function generator to said input circuit means of said digital code signal transfer circuit means;

means for applying said output digital code signal groups of said digital code signal transfer circuit means to the said input circuit means of said function generator;

means for converting said clock signal digital code signal group to a clock signal;

means for applying said clock signal to said digital code signal transfer circuit means;

means responsive to said crankshaft position digital code signal groups and the said digital code signal group applied to said input circuit means of said function generator for producing an output ignition spark initiating signal when one of said crankshaft position digital code signal groups is the same as said digital code signal group applied to said input circuit means of said function generator;

means for converting said reset signal digital code signal group to a reset signal; and means for applying said reset signal to said means for producing said excessive combustion pressure indicating signal for erasing said excessive cylinder combustion pressure indicating signal, if present.

3. An electronic ignition spark timing system modulated by cylinder combustion pressure for initiating the production of an ignition spark for each cylinder of an associated internal combustion engine comprising:

an excessive cylinder combustion pressure indicating signal generating means including a resettable memory circuit having set and reset signal input circuit means and output circuit means for producing, in response to the combustion pressure of a selected monitored cylinder of said engine, an excessive cylinder combustion pressure indicating signal upon said output circuit means of said resettable memory circuit when the combustion pressure of said monitored cylinder exceeds a predetermined value;

encoder means for producing for each cylinder of said engine a plurality of crankshaft position digital code signal groups, each of said digital code signal groups being a representation of a respective different engine crankshaft position in degrees relative to piston top dead center, and for producing successively once every two engine crankshaft revolutions a clock signal digital code signal group and a reset signal digital code signal group;

a function generator having input and output circuit means for producing as an output once every two engine crankshaft revolutions the digital code signal group representation of the engine crankshaft position in retard from that as represented by the last output digital code signal group thereof by a preselected number of engine crankshaft position degrees retard in response to the presence of said excessive cylinder combustion pressure indicating signal at the input circuit and for producing as an output once every two engine crankshaft revolutions the digital code signal group representation of the engine crankshaft position in advance of that as represented by the last output digital code signal group thereof by a preselected number of crankshaft position degrees advance in response to the absence of said excessive cylinder combustion pressure indicating signal at the input circuit;

digital code signal transfer circuit means for transferring the last said digital code signal group produced by said function generator to said input circuit means of said function generator in response to the application of a clock signal thereto;

means for converting said clock signal digital code signal group to a clock signal;

means for applying said clock signal to said digital code signal transfer circuit means;

means responsive to said crankshaft position digital code signal groups and the said last output digital code signal group produced by said function generator for producing an output ignition spark initiating signal when one of said crankshaft position digital code signal groups is the same as said last output digital code signal group produced by said function generator;

means for converting said reset signal digital code signal group to a reset signal; and means for applying said reset signal to said reset circuit means of said resettable memory circuit.

4. An electronic ignition spark timing system modulated by cylinder combustion pressure for initiating the production of an igniton spark for each cylinder of an associated internal combustion engine comprising:

an excessive cylinder combustion pressure indicating signal generating means including a resettable memory circuit having set and reset signal input circuit means and output circuit means for producing, in response to the combustion pressure of a selected monitored cylinder of said engine, an excessive cylinder combustion pressure indicating signal upon said output circuit means of said resettable memory circuit when the combustion pressure of said monitored cylinder exceeds a predetermined value;

encoder means for producing for each cylinder of said engine a plurality of crankshaft position digital code signal groups, each of said digital code signal groups being a representation of a respective different engine crankshaft position in degrees relative to piston top dead center, and for producing successively once every two engine crankshaft revolutions a clock signal digital code signal group and a reset signal digital code signal group;

a memory circuit for producing once every two engine crankshaft revolutions an output digital code signal group of the same number of bits as said engine crankshaft position digital code signal groups in response to the input signal combination of the last output digital code signal group produced thereby and the signal present upon said output circuit means of said resettable memory circuit, said memory circuit having an input circuit means and an output circuit means corresponding to each bit of said digital code signal group produced thereby and being preprogrammed to produce, with the presence of said excessive cylinder combustion pressure indicating signal, the digital code signal group representation of the engine crankshaft position in retard from that as represented by the last output digital code signal group thereof by a preselected number of engine crankshaft position degrees retard and to produce, in the absence of said excessive cylinder combustion pressure indicating signal, the digital code signal group representation of the engine crankshaft position in advance of that as represented by the last output digital code signal group thereof by a preselected number of crankshaft position degrees advance;

a digital code signal transfer circuit means having an input and a corresponding output circuit means corresponding to each bit of said digital code signal groups, each of said digital code signal transfer circuit means being of the type which transfers the signal present upon said input circuit means thereof to the respective corresponding said output circuit means thereof in response to the application of a clock signal thereto;

means for connecting each said output circuit means of said memory circuit to the said input circuit means of the corresponding said digital code signal transfer circuit means;

means for connecting said output circuit means of each of said digital code signal transfer circuit means to the said input circuit means of said memory circuit to which it corresponds;

means for converting said clock signal digital code signal group to a clock signal;

means for applying said clock signal to each of said digital code signal transfer circuit means;

means responsive to said crankshaft position digital code signal groups and the said digital code signal group present upon said output circuit means of said digital code signal transfer circuit means for producing an output ignition spark initiating signal when one of said crankshaft position digital code signal groups is the same as said digital code signal group present upon said output circuit means of said digital code signal transfer circuit means;

means for converting said reset signal digital code signal group to a reset signal; and means for applying said reset signal to said reset circuit means of said resettable memory circuit.

5. An electronic ignition spark timing system modulated by cylinder combustion pressure for initiating the production of an ignition spark for each cylinder of an associated internal combustion engine comprising:

an excessive cylinder combustion pressure indicating signal generating means including a resettable memory circuit having set and reset signal input circuit means and output circuit means for producing, in response to the combustion pressure of a selected monitored cylinder of said engine, an excessive cylinder combustion pressure indicating signal upon said output circuit means of said resettable memory circuit when the combustion pressure of said monitored cylinder exceeds a predetermined value;

encoder means for producing for each cylinder of said engine a plurality of crankshaft position digital code signal groups, each of said digital code signal groups being a representation of a respective different engine crankshaft position in degrees relative to piston top dead center, and for producing successively once every two engine crankshaft revolutions a clock signal digital code signal group and a reset signal digital code signal group;

a read only memory circuit for producing once every two engine crankshaft revolutions an output digital code signal group of the same number of bits as said engine crankshaft position digital code signal groups in response to the input signal combination of the last output digital code signal group produced thereby and the signal present upon said output circuit means of said resettable memory circuit, said read only memory circuit having an input circuit means and an output circuit means corresponding to each bit of said digital code signal group produced thereby and being preprogrammed to produce, with the presence of said excessive cylinder combustion pressure indicating signal, the digital code signal group representation of the engine crankshaft position in retard from that as represented by the last output digital code signal group thereof by a preselected number of engine crankshaft position degrees retard and to produce, in the absence of said excessive cylinder combustion pressure indicating signal, the digital code signal group representation of the engine crankshaft position in advance of that as represented by the last output digital code signal group thereof by a preselected number of crankshaft position degrees advance;

a type "D" flip-flop circuit corresponding to each bit of said digital code signal groups, said type "D" flip-flop circuits having input and output circuit means and a clock signal input circuit terminal;

means for connecting each said output circuit means of said read only memory circuit to the said input circuit means of the corresponding said type "D" flip-flop circuit;

means for connecting said output circuit means of each of said type "D" flip-flop circuits to the said input circuit means of said read only memory circuit to which it corresponds;

means for converting said clock signal digital code signal group to a clock signal;

means for applying said clock signal to said clock input terminal of each of said type "D" flip-flop circuits;

means responsive to said crankshaft position digital code signal groups and the said digital code signal group present upon said output circuit means of said type "D" flip-flop circuits for producing an output ignition spark initiating signal when one of said crankshaft position digital code signal groups is the same as said digital code signal group present upon said output circuit means of said type "D" flip-flop circuits;

means for converting said reset signal digital code signal group to a reset signal; and means for applying said reset signal to said reset circuit means of said resettable memory circuit.

* * * * *